Sept. 10, 1968   G. E. DOWNING   3,400,418
MACHINE FOR FORMING CUT-BACKS IN PIPE COATING
Filed Feb. 27, 1967   2 Sheets-Sheet 1

INVENTOR
GAR E. DOWNING
BY
*M M Portz*
ATTORNEY

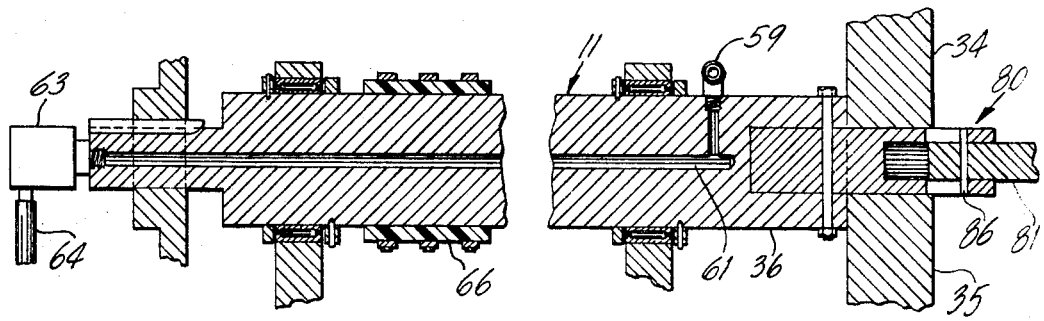
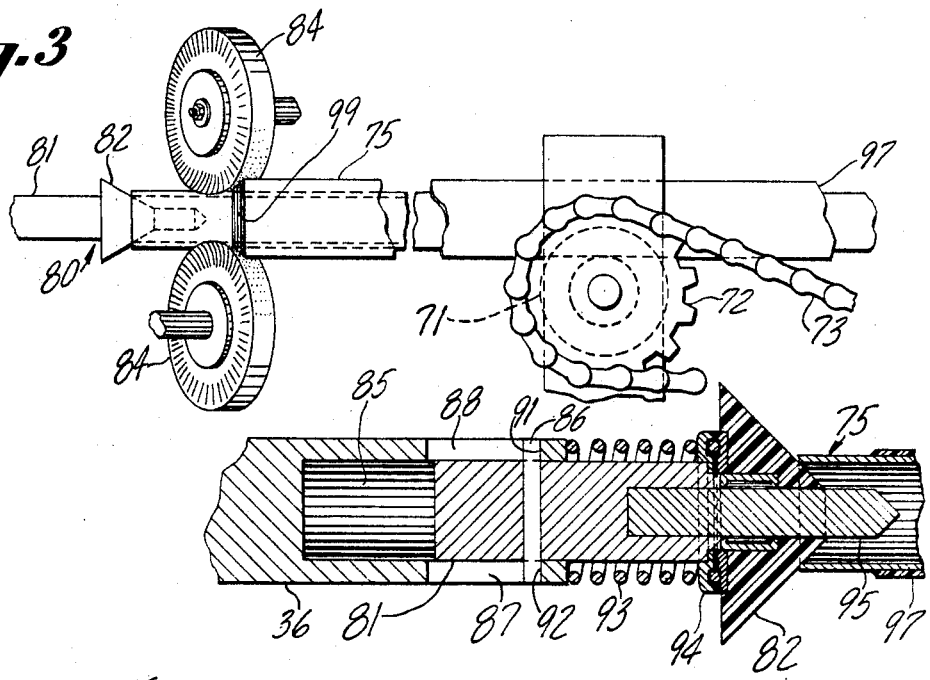
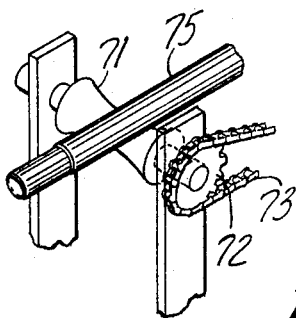

United States Patent Office 3,400,418
Patented Sept. 10, 1968

3,400,418
MACHINE FOR FORMING CUT-BACKS IN PIPE COATING
Gar E. Downing, Cleveland, Ohio, assignor, by mesne assignments, to General Steel Industries, Inc., a corporation of Delaware
Filed Feb. 27, 1967, Ser. No. 619,544
11 Claims. (Cl. 15—88)

ABSTRACT OF THE DISCLOSURE

A machine for stripping coating material from end portions of pipes and for shaping the end of the initial unremoved coating material on a pipe as an annular tapered surface. The machine has horizontally and vertically adjustable portions for supporting and positioning a rotor rotated in coaxial relation with a pipe to be subjected to a cut-back operation, and other portions carried by the rotor for applying rotary brushes to the exterior of the pipe.

Description

In manufacturing pipes adapted for building underground welded-joint pipelines, the pipes which ordinarily vary in length from 10 to 60 feet are coated for protection against corrosion. The in-plant processes for coating pipe, whether they concern the application of synthetic plastic compositions or bituminous enamels, wrapped paper, or other coating materials, involve feeding pipe in continuously-moving end-to-end relationship through coating machines which cover the whole length of the pipes. Before welding the pipes into a pipeline, a few inches of the coating are removed at each end of a pipe in order to facilitate the welding operation. Such removal of coating material is known in the trade as a "cut-back." After welding, the cut-back surfaces, i.e., the stripped area adjacent to the welded joint, are recoated by forming an annular patch thereover to provide a continuous imperforate coating for the entire pipeline.

Restoration of the coating by construction of a patch over the stripped area is more difficult to effect if the stripped area is bounded by square-cut shoulders of the coating layer, i.e., shoulders produced by cutting inward on the initial coating along a diametral plane of the pipe preparatory to stripping the coating material nearer to the end to form the cut-back. Bonding of the patch coating and complete elimination of air pockets so essential to prevention of pipe corrosion is most difficult to achieve at the base of the shoulders.

The practice of recent years has been to provide coated pipes for field assembly of which the original coating terminates at the cut-back in an annular beveled surface over which it is relatively easy to form a splice or joint of the patch coating without entrapment of air or a bonding failure. A tapered surface may be provided as a final part of the operation of forming the cut-back or, as a common current practice, the square shoulders are re-shaped in a separate operation after the cut-back is formed to a tapered contour.

Prior to the present invention there has been a lack of satisfactory machines having the capability of forming cut-backs or coating bevels on small pipes, e.g., pipes of three-fourths inch inside diameter as well as larger pipes varying in sizes to, e.g., ten inches or more of inside diameter. This is particularly true regarding cut-back machines utilizing rotary wire brushes as implements for removing coating material. In general, the smallest pipes that are commercially coated are too flexible and, hence too difficult to support for satisfactory cut-back or beveling operations by present rotary wire brush equipment.

An essential object of the invention is to provide a rotary brush machine capable of performing cut-back and beveling operations on pipes from a large range of pipe diameters.

A further object is to provide a cut-back and beveling machine in accordance with the foregoing object with the coating-removing portion thereof adjustable to different operating heights.

It is also an object to provide a cut-back and beveling machine of which the cutting elements are capable of following an eccentrically moving continuous surface such as a somewhat flatteneded pipe of improperly centered pipe.

Another object is to provide a rotary brush machine in accordance with the foregoing objects adaptable to automation and simultaneous cut-back operations at both ends of a pipe.

Still another object is to provide a machine in accordance with foregoing objects capable of performing cut-back and beveling operations on pipes restrained from rotation wherein either the machine or the pipe may be moved in the direction of the longitudinal axis of a pipe in operative position with respect to the machine.

The invention achieves the above and other objects in an apparatus especially adapted to form a desired bevel in pipe coating at the terminus of a cut-back region, and if desired to remove the coating material forming the cut-back, comprising a support, such as carriage, horizontally-guided platform, or a frame; a frame-like elevator carried by the support in adjustable vertically guiding relation therewith; a rotor comprising, e.g., a shaft in journal-bearing relation with the elevator, having one or more radially extending arms, the rotor being mounted on the elevator for rotation about a horizontal axis in fixed relation with the elevator; a slip member on each arm in radially-adjustable guide relation therewith; and an assembly for removing coating material from a pipe mounted on each member. Such assembly comprises a bracket pivotally connected with the member to swing toward and away from the rotor axis; a shaft rotatably supported by the bracket with its axis aligned in transverse spaced relation with the rotor axis; a rotary brush or other cutter mounted on the shaft in fixed coaxial relation therewith to be carried by the bracket approximately along a plane containing the rotor axis; means, such as an electric motor, for rotating the shaft, and control means, such as a pneumatic cylinder connected to the member and the bracket and reacting therebetween to shift the brush to different positions of spacing from the rotor axis.

In a preferred embodiment the assembly mentioned above includes an electric motor which comprises a portion of the shaft, and a motor mounted on the elevator for driving the rotor.

To produce relative movement between the machine and the work, the invention contemplates mounting of the support on horizontal guide means, such as a pair of rails parallel to the axis of the rotor and a work-piece support-axis as defined by a pipe support aligned with a machine to place a pipe in coaxial relation with the rotor axis.

In the drawing with respect to which this invention is described:

FIG. 2 is a fragmentary shortened view in longitudinal cross section of a rotor and rotor-supporting bearing structure of the machine illustrated in FIG. 1;

FIG. 3 is a fragmentary elevation illustrating a pipe in centered relation with a mandrel of the machine of FIGS. 1 and 2 with rotary brushes of the machine in operative position on the pipe;

FIG. 4 is an enlarged fragmentary longitudinal sectional view of the pipe-centering mandrel and a section of pipe; and FIG. 5 is a fragmentary perspective view of the pipe-supporting roll and the pipe portion shown in FIG. 3.

Figure 1:
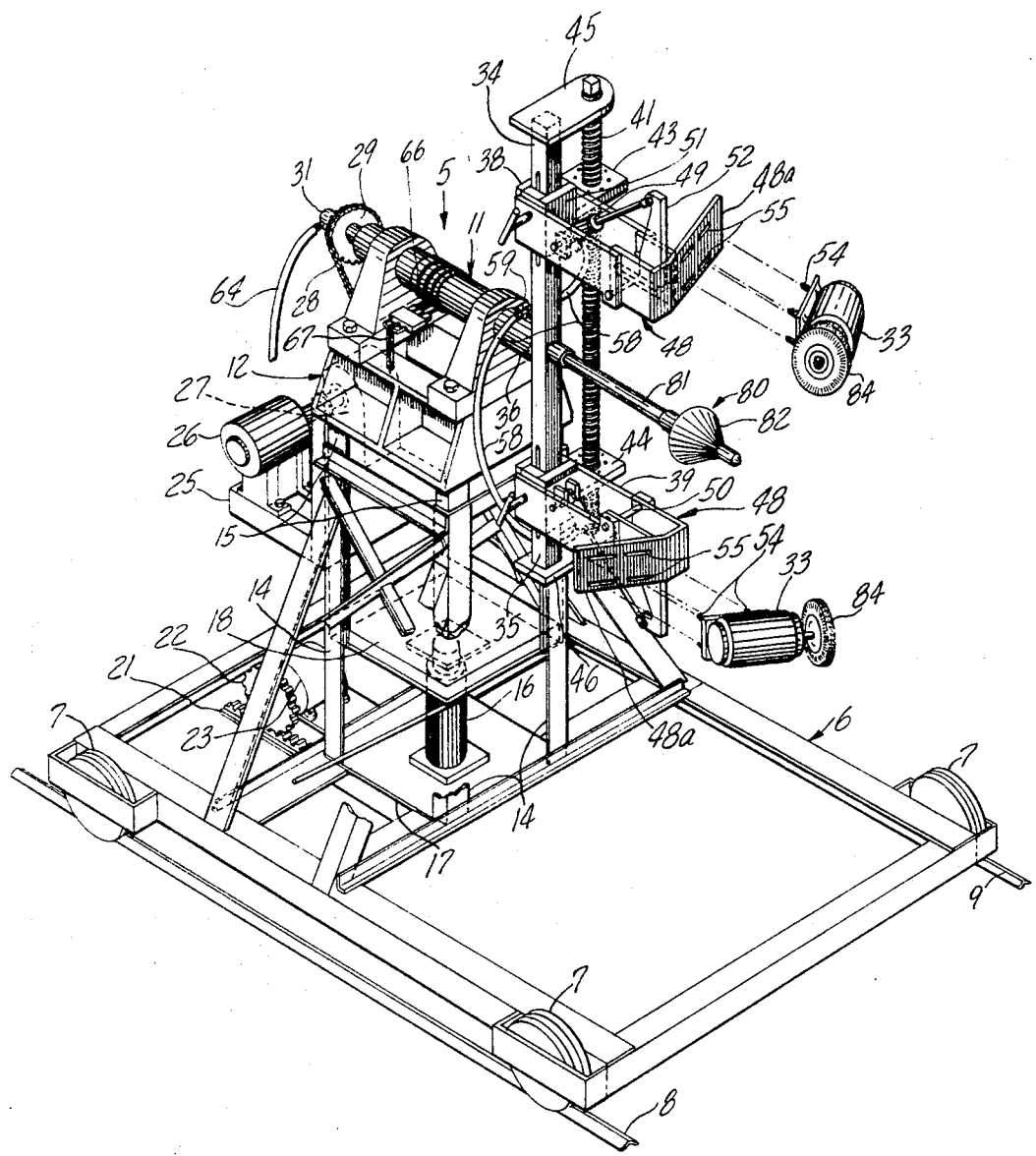
FIG. 1 is a perspective view with some parts detached and other parts broken away to facilitate illustration of essential components.

FIG. 1 illustrates in a perspective assembly view essential portions of a machine 5 in accordance with the invention for forming cut-backs and beveled end-surfaces in pipe coating material on end portions of pipe. The machine 5 comprises a skeleton frame or support 6 having wheels 7 in tracking relation with a track, i.e., rails 8 and 9, which, in a generic sense, establish guide relationship of the support 6 with a stationary guide in a normally horizontal direction parallel with an axis of rotation of a rotor 11. This rotor is mounted in rotatable journal-bearing relation with a frame-like elevator 12 supported by the carriage or support 6 within vertical guide elements 14. The elevator 12 includes vertical posts or guides 15 adapted to slide along the inner surfaces of the posts 14 and thus place the elevator in vertically guided relation with the support 6. The elevator 12 is raised or lowered relative to the support 5 by a jack 16 which reacts between a panel 17 of the support and a panel 18 of the elevator. The entire machine 5 may be located relative to the length of the tracks 8, 9 by a rack 21 in fixed relation with the tracks, a pinion 22, and a slowly revolving driving means 23 therefor mounted on the support or carriage 6.

The elevator 12 has a platform 25 on which is mounted driving means, such as a drive unit comprising a motor 26 and a speed reduction drive 27. The latter is connected to the rotor 11 by a sprocket system including the chain 28 and a sprocket 29 mounted on the shaft 31 of the rotor.

For supporting motor-brush units 33, the rotor 11 further includes arms 34, 35 extending in opposite radial directions from the axis of the rotor 11. The arms 34, 35 are welded or otherwise secured to a thick axial portion 36 of the rotor and are of square cross-section in order to establish guiding relation with an associated slip member 38 or 39 carried by each arm.

The slip members 38, 39 have openings of rectangular cross-section complementary with the cross-section of respective arms 34, 35. As the cross-section of the arms is uniform, the slip members are radially adjustable with respect to the axis of the rotor 11 by a screw drive 41 having oppositely threaded sections in threaded relation with lugs 43 and 44 of respective slip members. The screw drive is supported by end plates 45, 46 of the arms 34, 35 functioning as bearings in which the screw drive is received in journal-bearing relationship.

Adjustability of the slip members by operation of the screw provides adjustability of the motor-brush units 33 in a basic way for receiving the various sizes of pipe. However, the machine would be too rigid and inconvenient to operate were there no further provisions for movement of the motor-brush units 33. As the work is finished on each pipe, a further requirement is that the motor-brush units be suddenly retracted from the region in which the brushes engage the pipe in order to facilitate the removal of the pipe from its work station and substitution therefor of an unworked pipe. A further need is that the motor-brush units ride the pipe being worked during operation in a resilient manner so that the brush may yield as it passes over the circumferential or eccentric irregularities in the surface of the pipe.

In filling these needs, the machine further comprises an assembly mounted on each slip member which, in addition to the motor-brush unit 33, comprises a bracket 48 for each slip member 38, 39 pivotably connected to the respective member by a pin extending through the bracket and of a pair of arms of each slip member extending parallel to the rotor axis toward the region of pipe storage. The pivotal axis for the bracket 48 as established by, e.g., pin 50, is in crosswise spaced relation with the rotor and its axis, and substantially spaced from a supporting arm 34 or 35. Such horizontal spacing enables the assembly to accommodate and further include a pneumatic cylinder 49 acting between the sleeve portion 51 of the slip member and an arm 52 of the bracket 48 extending in a suitable radial direction with respect to the tilting axis of the bracket. In the embodiment shown, the tilting axis of the bracket is contained approximately in a plane at right angles with the axis of rotor 11. Hence, the assemblies just described move through arcs along planes which are parallel to, and contain the rotor axis. In FIG. 1, the motor-brush units 33 are shown detached from the bracket. In working position, the motor-brush units are secured to the brackets by bolts 54 which extend through holes 55 of the brackets.

Referring to FIG. 2, air is supplied to the pneumatic cylinders 49 by flexible tubes 58 connected with a T connector 59. The connector 59 is connected in threaded relationship with portion 36 of the rotor and in communication with an internal passageway 61 of the rotor extending axially thereof into communication with a rotary coupling 63 which connects with an air supply duct 64. The latter duct has a suitable control valve therein (not shown) for operating the air cylinders 49 in positioning the motor-brush units relative to respective bracket axes in retracted or working positions. The rotor also carries suitable electrical cable or other conductors to the motors of the units 33 from a commutator 66 connected with an electrical supply 67.

The present invention contemplates relative movement of the machine and the work such that either the machine may be moved along the rails 8, 9 while the pipe is held stationary, or the pipe being worked upon by the machine is fed linearly thereinto by apparatus such as plurality of hour glass rolls of which roll 71 is typical. As this roll is connected with a sprocket drive of which a sprocket 72 is shown fixed coaxially on the shaft of the roll 71, and a chain 73 connects the sprocket 72 with a power source not shown. As weight of the pipe is a factor in the satisfactory use of hour glass rolls, shifting of the pipe rather than the machine is a more satisfactory method with large pipe sizes.

In the usual situation, the hour glass roll 71 and other rolls cooperating therewith to support the pipe 75, maintain the pipe, regardless of size, at a fixed height. As the size of the pipe is changed, the height of the axis of the supported pipe changes and the elevator 12 is raised or lowered by the jack 16 to bring the rotor axis into alignment with the axis of the pipe supported on the rolls.

As an important feature of the machine 5, the rotor 11 comprises a centering mandrel 80 having a shaft 81 disposing a cone 82 of the mandrel approximately between wire brushes 84 of the units 33. In fully extended position, the cone 82 is normally positioned between the brushes. The mandrel is connected with rotor shaft portion 36 by structure, such as shown in FIG. 4, whereby the mandrel may retract along the axis of the rotor inwardly of a coaxial bore 85 in the rotor portion 36. Relative movement of the mandrel shaft 81 inwardly of the bore is limited by a pin 86 extending through the shaft 81 into axially elongated rotor slots 87 and 88 through the range of movement permitted to the pin lengthwise of the slots. When the mandrel is fully outthrust with the pin engaging end surfaces 91 and 92 of the slots, the cone 82 is located approximately between the brushes 84. It is normally urged to this position by a spring 93 bearing against a bearing 94.

The cone 82 is mounted rotatably on the guide pin 95 in order that the cone may remain non-rotatable when engaged with a non-rotating pipe. Thus, as either the pipe or the machine 5 is advanced in a direction to cause advancement of the pipe through the area swept by the brushes, the mandrel retracts inwardly of the bore 85.

In a typical operation, the pipe 75 is placed on supporting rolls, such as the roll 71, with the extreme end of the pipe and the coating 97 thereof positioned in a plane normal to the rotor axis along which the brushes 85 engage a work piece. At this point, the units 33 may be set in rotation at the outward retracted positions. The motor 26 may then be energized to set the rotor 11 into motion. With the arms 34 and 35 now revolving, the air cylinders are actuated to swing the units 33 into working relation with the pipe end. Thereafter the pipe 75 is slowly advanced in a direction toward the left as viewed in FIG. 3 for a distance equalling the desired cut-back. When the cut-back is completed the air cylinders 49 are operated to retract the motor-brush units 33.

The pipe 75 may be disengaged from the mandrel 80 by either operation of the roll 71 to withdraw the pipe toward the right as viewed in FIGS. 3 and 4, or the machine may be reversed toward the left by operation of the rack and pinion apparatus 21, 22, 23. Disengagement of the pipe by movement of the machine is most advantageous in cut-back operations on pipes of uniform length. In this situation, opposed machines may be stationed at opposite ends of a pipe-receiving station and cut-backs performed on both ends simultaneously. Whether simultaneously operated or not, a machine is stationed at opposite sides of the pipe receiving station since opposite ends of each pipe are subject to a cut-back operation. While an arrangement for performing simultaneous cut-backs is adaptable to fully automatic operation, experience indicates that, when successive pipes are of varying length, or the sizes of the runs of different size pipes are small, it is preferable to utilize pipe advancing rolls such as roll 71, and maintain the machine 5 in fixed position.

An important function of the machine 5 is to prepare a beveled surface 99 of a desired inclination relative to the pipe axis. This angle is adjusted to a desired value by the amount of bias of the shaft axes of the units 33 with respect to a plane perpendicular to the axis of the rotor 11. The amount of bias of the shafts of unit 33 is most conveniently adjusted by bending or otherwise forming the motor-supporting plates 48a of the brackets 48 to a desired angle respective to a plane perpendicular to the rotor axis. For efficient cuting of the coating material 97, the brushes 84 comprise radially aligned wires filled and reinforced with a synthetic plastic such as a urea or phenol formaldehyde composition cured in situ.

The machine disclosed hereinabove is adapted to form cut-backs or bevels with rapidity and precision on coated pipes of all sizes. In a commercial sense, the machine is particularly suited for processing pipes which range upward in size from three-fourths of an inch in inside diameter regardless of surface irregularities.

What is claimed is:

1. A machine for removing coating material from pipes comprising:
    a support;
    an elevator in adjustable vertically-guiding relation with the support;
    a rotor in journal-bearing relation with the elevator for rotation about a generally horizontal axis in fixed relation with the elevator, said rotor having a radially-extending guide arm;
    a slip member in radially adjustable guide relation with the arm; and
    an assembly mounted on said member comprising a shaft rotatably supported in the assembly with its axis aligned transversely of the rotor axis, a circular brush mounted on the shaft in fixed coaxial relation therewith and in relation to the arm to be moved toward and away from the rotor axis by movements of the member relative to the arm, and means for rotating the shaft.

2. A machine for removing coating material from pipes comprising:
    a support;
    an elevator in adjustable vertically-guiding relation with the support;
    a rotor in journal-bearing relation with the elevator for rotation about a horizontal axis in fixed relation with the elevator, said rotor having a radially-extending guide arm;
    a slip member in radially adjustable guide relation with the arm; and
    an assembly mounted on said member comprising a bracket pivotally connected with the member to swing toward and away from said axis, a shaft rotatably supported by the bracket with its axis aligned transversely of the rotor axis, a circular brush mounted on the shaft in fixed coaxial relation therewith to be carried by the bracket approximately along a plane containing the rotor axis, means for rotating the shaft and control means connected to the member and the bracket and reacting therebetween to shift the brush to different positions relative to said rotor axis.

3. The machine of claim 2 comprising:
    a plurality of said arms integrated within said rotor at equal angles about said rotor axis, and corresponding pluralities of said slip member and said assembly carried on said arms; and
    means for simultaneously adjusting said members toward or away from the rotor axis.

4. The machine of claim 2 comprising:
    a pair of said arms extending as integral portions of said rotor in opposite directions from said rotor axis and corresponding pairs of said slip member, said assembly, and said control means;
    means for simultaneously adjusting said members toward or away from the rotor axis; and
    means for simultaneously operating said control means of both assemblies.

5. The machine of claim 3 comprising:
    a pipe centering mandrel in coaxial, relatively rotatable bearing relation with the rotor with a pipe-engaging portion thereof disposed between said brushes.

6. The machine of claim 2 comprising:
    a base having horizontally aligned guide means;
    said support being connected in reciprocal guide relation with said guide means, and said rotor axis being aligned in parallel relation with the guiding direction of said guide means.

7. The machine of claim 3 wherein:
    the axes of rotation of the brushes are biased relative to a plane perpendicular to the rotor axis in accordance with the desired angle of taper in the coating material of a pipe supported in operable position relative to the machine.

8. The machine of claim 3 wherein:
    the arms are of uniform non-circular cross-section and the member carried on each arm is complementarily apertured to effect said guide relationship.

9. The machine of claim 4 wherein:
    a motor and brush unit mounted on the bracket provide said shaft, brush, and means for driving the shaft; and said means for simultaneously adjusting said members comprises bearings supported at radially outer ends of both arms, and a screw drive in threaded relation with both members, said drive being rotatably supported by the bearings.

10. The machine of claim 2 comprising:

means for driving the rotor carried on said elevator.

11. The machine of claim 3 wherein:

said control means comprises a pneumatic cylinder in each of said assemblies.

References Cited

UNITED STATES PATENTS

| 2,928,112 | 3/1960 | Nelson et al. | 15—21 |
| 3,121,898 | 2/1964 | Morain | 15—88 |

FOREIGN PATENTS

| 444,842 | 1/1926 | Germany. |

EDWARD L. ROBERTS, *Primary Examiner.*